United States Patent [19]

Lachocki

[11] 3,736,496
[45] May 29, 1973

[54] ENERGY PUMP VOLTAGE REGULATOR

[75] Inventor: Eugene Lachocki, Turnersville, N.J. 08012

[73] Assignee: RCA Corporation, New York, N.Y.

[22] Filed: Dec. 13, 1971

[21] Appl. No.: 207,286

[52] U.S. Cl. ............... 323/22 T, 321/2, 321/27 R, 323/25, 323/DIG. 1
[51] Int. Cl. ............................................... G05f 1/56
[58] Field of Search ............... 321/2, 27 R; 323/8, 323/17, 22 T, 25, 62, DIG. 1

[56] References Cited

UNITED STATES PATENTS

| | | | |
|---|---|---|---|
| 3,427,525 | 2/1969 | Thornwall | 321/2 |
| 3,219,906 | 11/1965 | Keller et al. | 321/2 X |
| 3,300,656 | 1/1967 | Meier et al. | 321/2 UX |
| 3,571,697 | 3/1971 | Phillips | 323/17 |
| 3,523,239 | 8/1970 | Heard | 321/2 X |
| 3,569,817 | 3/1971 | Boehringer | 321/2 |

Primary Examiner—A. D. Pellinen
Attorney—Edward J. Norton

[57] ABSTRACT

A circuit for increasing and regulating the voltage appearing at the input terminals of a power supply. A plurality of cascaded stages are provided. Each stage comprises: an inductive energy storage device; a switching device; a control device; and a discharge path. Control signals, having a selectable sequential time relation therebetween, are provided to the stages so that energy discharged from adjacent stages is caused to overlap in time. The amount of overlap is adjustable and is dependent upon the sequential time relation between the control signals which is selected.

7 Claims, 8 Drawing Figures

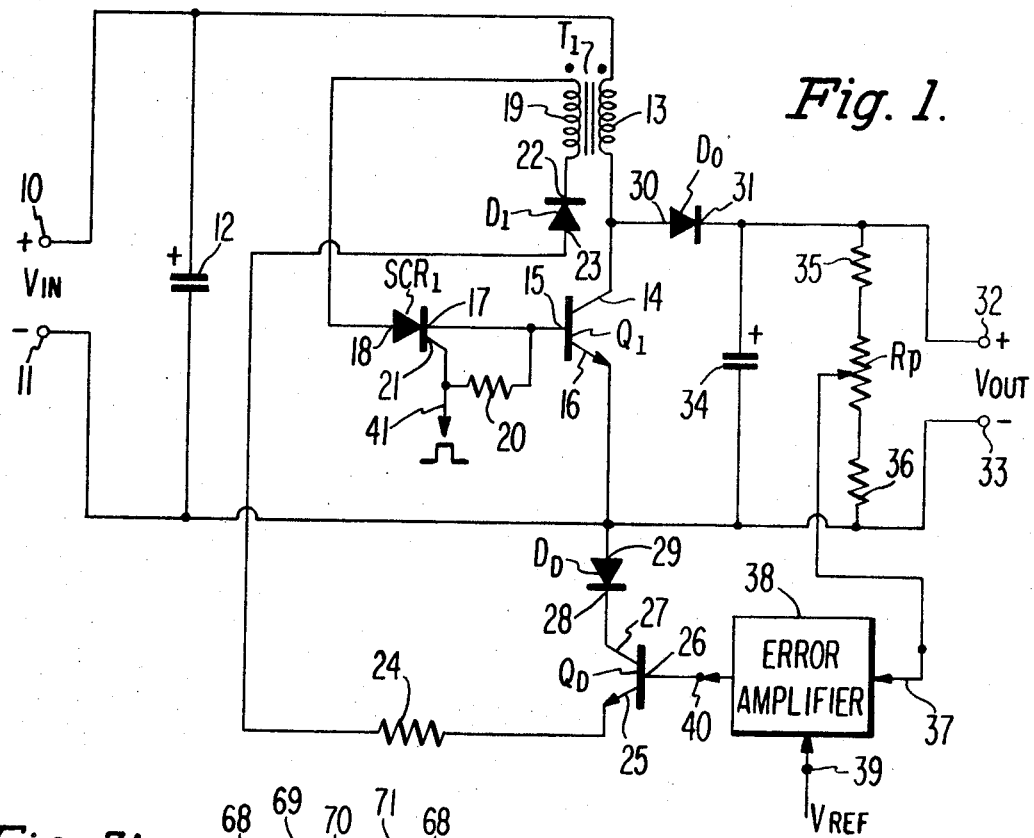
Fig. 1.
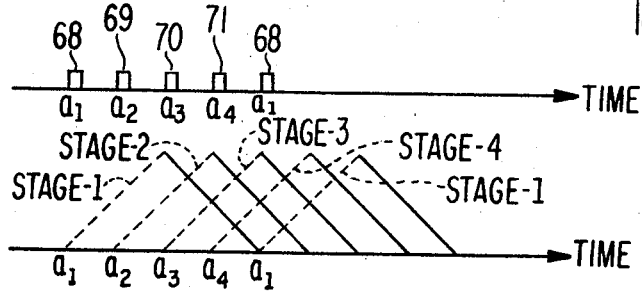
Fig. 3A
Fig. 3B
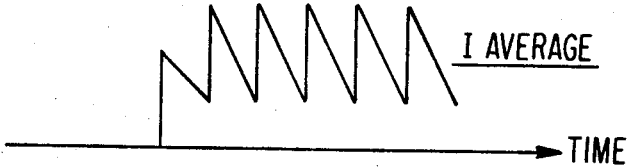
Fig. 3C
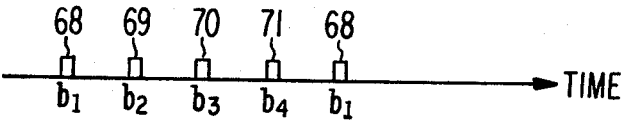
Fig. 3D
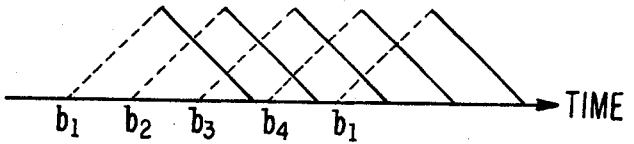
Fig. 3E
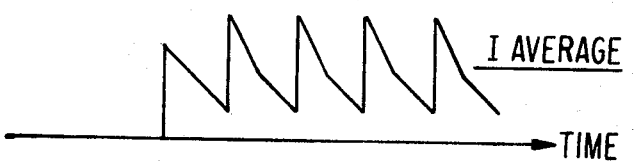
Fig. 3F

ENERGY PUMP VOLTAGE REGULATOR

This invention relates generally to power supplies and more particularly to a regulating power supply having the capability of increasing the voltage level appearing at the supply input terminals while regulating the voltage at a predetermined level at the output terminals of the supply.

There are several types of voltage regulators in the prior art that can reduce an input voltage level and maintain the output voltage at a relatively constant level. The latter types of regulators include series and shunt power dissipating types, magnetic regulators and duty cycle controlled switching regulators with constant or variable operating frequencies. The previously mentioned regulators do not generally have the ability to provide a regulated output voltage whose level is higher than the input voltage level. Thus, the present invention has been termed Energy Pump Voltage Regulator.

A device capable of increasing voltage levels as well as performing regulation is extremely useful in extending the life of a primary wet or dry battery, solar cell or any variable power source. An energy pump regulator, of the type to be described more fully herein, has the ability to raise and regulate the voltage from a 6 or 12 volt D. C. battery to, say for example, 28 volts or higher. Should the battery voltage drop below its minimum required level, the energy pump regulator will increase the output voltage level of the battery to the level required by the working equipment. As a result the energy remaining in the battery will still be useful. Therefore, the energy pump regulator will extend the useful life of a battery such as that found, for example, in an automobile.

In accordance with the present invention an energy pump circuit is provided wherein an inductive energy storage means is allowed to store energy at selected times while the peak energy level stored in the storage device is controlled by a variable impedance device. The variable impedance device is controlled by a signal related to the signal appearing across the output terminals. A discharge path is provided between the energy storage means and at least one output terminal.

Also, in accordance with the present invention a circuit is provided wherein a plurality of stages are connected between at least one input terminal and one output terminal. Each stage in the cascaded arrangement comprises: an energy storage means; a switching device coupled to the storage means; and a discharge path coupling the energy storage means to one of the output terminals. There is also provided a signal generating means for supplying control signals to each of the switching devices in order to control the transfer of energy from each of the stages to the output terminal.

An energy pump of the last mentioned type permits an overlap in operation of adjacent stages by the manner in which the control signals are applied to the various stages. Overlapping operation of the stages increases the power capability of the circuit and increases the average output current and also results in a decrease in the size of storage capacitors, if required, and reduces the output ripple voltage.

In the Figures:

FIG. 1 is a diagram of an embodiment of a single stage energy pump regulator according to the present invention;

FIGS. 3A – 3F are waveforms helpful to the explanation of the operation of the energy pump regulator shown in FIG. 2.

Figure 2:
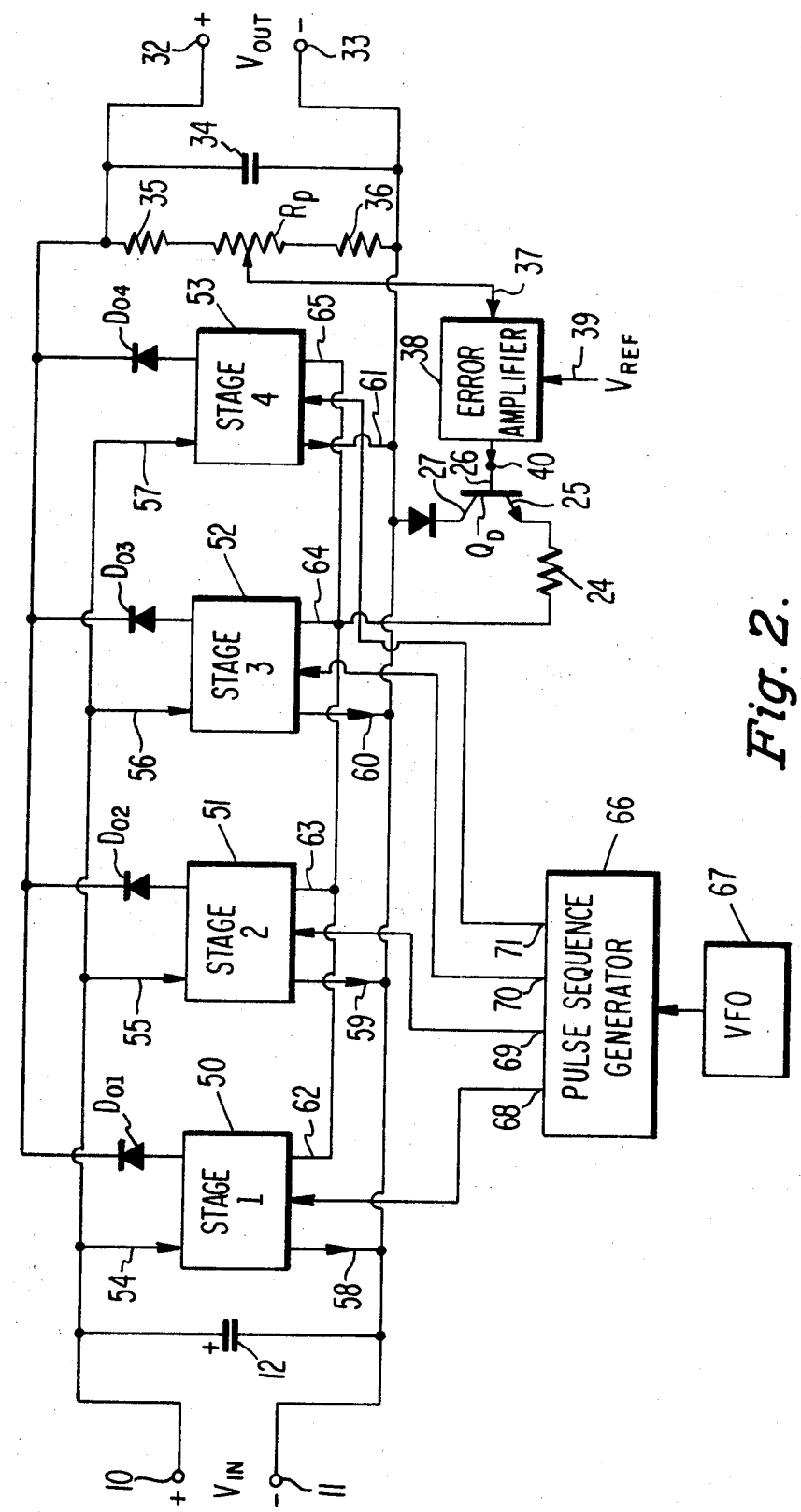
FIG. 2 is a diagram of an embodiment of a four stage energy pump regulator according to the present invention.

Referring now to FIG. 1, a source of unregulated D. C. voltage (not shown) supplies a signal $V_{in}$ which is applied to a pair of input terminals 10 and 11, with the positive polarity being applied to terminal 10, and the negative polarity being applied to terminal 11. An input circuit capacitor 12 is connected directly across the input terminals 10 and 11.

Input terminal 10 is also connected to one end of the primary winding 13 of transformer $T_1$. The other end of the primary winding 13 is connected to the collector electrode 14 of transistor $Q_1$. Transistor $Q_1$ also has a base electrode 15 and an emitter electrode 16.

The base electrode 15 is connected to the cathode electrode 17 of a silicon controlled rectifier $SCR_1$. The anode electrode 18 of $SCR_1$ is connected to one end of the secondary winding 19 of transformer $T_1$. A resistor 20 is connected between the gate electrode 21 and the cathode electrode 17 of $SCR_1$.

The other end of the secondary winding 19 of transformer $T_1$ is connected to the cathode electrode 22 of diode $D_1$. The anode electrode 23 of diode $D_1$ is connected through a resistor 24 to the emitter electrode 25 of transistor $Q_D$. Transistor $Q_D$ has a base electrode 26 and a collector electrode 27.

The collector electrode 27 is connected to the cathode electrode 28 of diode $D_D$. The anode electrode 29 of diode $D_D$ is connected to the emitter electrode 16 of transistor $Q_1$. The junction between the anode electrode 29 and the emitter electrode 16 is also electrically connected to the input terminal 11.

A diode $D_o$ has its anode electrode 30 connected to the junction point between the collector electrode 14 and the primary winding 13 of transformer $T_1$. The cathode electrode 31 of diode $D_o$ is connected to one output terminal 32. The load (not shown) to be supplied with the output voltage, $V_{out}$, may be placed across the output terminals 32 and 33. Output terminal 33 is also electrically connected to the anode electrode 29 of diode $D_D$.

An output filter capacitor 34 is placed across the output terminals 32 and 33. Also connected across the output terminals 32 and 33 is a voltage divider network comprising the serial combination of resistor 35, potentiometer $R_p$ and resistor 36.

The center arm of potentiometer $R_p$ is electrically connected to input terminal 37 of error amplifier 38. A reference signal, $V_{REF}$, from a reference source, (not shown) is supplied to another input terminal 39 of amplifier 38. The output terminal 40 of amplifier 38 is connected to the base electrode 26 of transistor $Q_D$.

The operation of the energy pump regulator of FIG. 1 is as follows. A positive pulse A is applied to the gate electrode 21 of $SCR_1$ from a source (not shown) via line 41. Pulse A triggers the stage into operation.

When $SCR_1$ is triggered into conduction by the application of pulse A, transistor $Q_1$ begins to conduct. Transistor $Q_1$ collector current starts to flow from the positive input terminal 10 through the primary winding 13 of transformer $T_1$, and the collector to emitter path of transistor $Q_1$.

The current, rising in magnitude, through the primary winding 13 of transformer $T_1$ induces a voltage in the secondary winding 19 of transformer $T_1$. The base current supplied to transistor $Q_1$ will be limited by the magnitude of the induced voltage in the secondary winding 19 of transformer $T_1$ and by the impedance represented by transistor $Q_D$.

A regenerative situation has been initiated whereby the forward bias and the collector current related to transistor $Q_1$ continue to increase until transistor $Q_1$ reaches a saturated condition of operation.

When transistor $Q_1$ saturates, the magnetic field created by the previously increasing collector current of transistor $Q_1$ through the primary winding 13, will suddenly collapse. The induced voltage in the secondary winding 19 will reverse polarity thereby reverse biasing $SCR_1$ and cutting-off transistor $Q_1$. The energy stored in the inductance represented by the primary winding 13 is now supplied to the output terminal 32 via the discharge path including the diode $D_o$.

Upon completion of the discharge of energy from the primary winding 13 of transformer $T_1$, $SCR_1$ will once again be forward biased by virtue of the voltage induced in the secondary winding 19. However, the initiation of energy storage in the primary winding will not occur until such time as another pulse is applied to the gate electrode 21 of $SCR_1$.

The transistor $Q_D$ acts as a variable impedance device whose impedance is controlled by the amount of base drive supplied from the output terminal 40 of error amplifier 38. Error amplifier 38, which may for example, be in the form of a balanced or unbalanced difference amplifier, provides a signal at amplifier output terminal 40 which is related to the signal appearing between output terminals 32 and 33.

The application of pulses to the gate electrode 21 of $SCR_1$ will determine and control the time between the initiations of the energy storage cycle in the primary winding of transformer $T_1$.

Thus the circuit shown in FIG. 1 allows two degrees of freedom in providing a regulated output voltage across terminals 32 and 33, namely, (a) control over the impedance of transistor $Q_D$ and thus the control over the peak charging current flowing through the primary winding of transformer $T_1$ and (b) control over the initiation of the energy storage cycle.

Moreover, the arrangement of FIG. 1 lends itself to a cascading of stages where overlap operation of individual stages is made possible. The cascade arrangement is shown in FIG. 2, where elements and terminals common to FIG. 1 have been given the same identifying designations as in FIG. 1.

In FIG. 2 each of the blocks designated 50, 51, 52 and 53, corresponding to stages 1 – 4 of the cascade arrangement, contain the circuitry described in conjunction with FIG. 1.

Input terminal 10 is electrically connected to one end of each primary winding via lines 54 – 57. Each of stages 1 – 4 has a connection from the respective emitter electrodes of their transistor $Q_1$ to the common line between input terminal 11 and output terminal 33 via lines 58 – 61. The emitter electrode 25 of transistor $Q_D$ is connected, through resistor 24 to the anode electrode of the $D_1$ diode in each of stages 1 – 4 via lines 62 – 65 respectively.

The discharge paths for each of the stages 1 – 4 are shown outside of the blocks 50 – 53. Diodes $D_{o1}$, $D_{o2}$, $D_{o3}$ and $D_{o4}$ are in the respective discharge paths for stages 1 – 4.

In addition to the connections just mentioned for cascading stages 1 – 4, there is shown in FIG. 2 a pulse sequence generator 66 which is driven from a clock source designated as variable frequency oscillator 67.

The function of the pulse sequence generator 66 is to accept the clock signal or pulse train from the oscillator 67 and to sequentially provide a pulse to each of the generator output terminals 68, 69, 70 and 71. Terminals 68–71 are electrically connected to the gate electrodes of the SCR's in stages 1 – 4 respectively. Therefore, the gate electrodes of the SCR's in stages 1 – 4 are supplied by pulses which have a known or predetermined sequential relationship with respect to each other.

As the frequency of oscillator 67 changes, manually or automatically, the time spacing between the pulses at terminals 68 – 71 will change. In this manner one may control the sequential initiation of the operation of stages 1 – 4, that is, the relative times at which the operation of each stage will be started.

There are several ways to implement the structure of the pulse generator 66. One convenient approach is to utilize a ring counter with four output taps. This latter approach is illustrative only and not limiting in the type of structure which may be used to perform the function of the oscillator 67 and the ring counter 66.

The operation of the multistage energy pump regulator may be better understood with reference to the waveforms shown in FIGS. 3A – F.

FIG. 3A shows the time relationship between the pulses appearing at terminals 68 – 71 and delivered to the gate electrodes of the SCR's in stages 1 – 4 respectively.

FIG. 3B shows the collector current waveform for the $Q_1$ transistor for each of the stages 1 – 4 (without addition). The dashed line represents the charging current for the primary winding for each stage and the solid line represents the discharge current which flows to the load terminal 32.

FIGS. 3A and 3B taken together demonstrate the sequential operation of stages 1 – 4 and also demonstrates how the discharging currents are made to overlap.

FIG. 3C shows the output current waveform and demonstrates the current adding capability of the circuit resulting from the overlap operation.

FIG. 3D shows how a decreased frequency clock signal from the oscillator 67 spreads out the time between pulses appearing on lines 68 – 71 as compared to the time spacing of FIG. 3A.

FIG. 3E shows the decrease in overlap operation as a result of the decrease in frequency of the signal from the oscillator 67.

FIG. 3F shows how the average current delivered to the output terminal 32 is decreased as a result of the decrease in frequency of the oscillator 67.

Returning to the circuit of FIG. 2, if desired, a useful addition to the circuit may include a connection from the output terminal 40 of the error amplifier 38 to the frequency control portion of the oscillator 67. In this manner, the change in frequency of the oscillator which results in a change in overlap operation, leading to a change in output current delivered to terminal 32, would be made automatically dependent upon the signal appearing across the output terminals. Care must be taken to ensure that this feedback loop is stable in order to avoid undesirable oscillation.

A four stage energy pump regulator circuit has been built and has successfully provided a 32 volt D.C. regulated output voltage for an input voltage range of 17–30 volts D.C.

Although a four stage energy pump regulator has been described as an embodiment of the invention, many more stages may be employed for a particular application. The four stage circuit is described only as an illustration of a multistage energy pump regulator.

I claim:

1. An energy pump voltage regulator comprising:
   a pair of input terminals adapted for connection to a source of potential, said source being capable of providing a range of potentials;
   a pair of output terminals adapted for connection to a load;
   a plurality of cascade connected stages coupled between at least one of said input terminals and at least one of said output terminals, each stage comprising:
   a. an inductive energy storage means having first and second terminals, the first terminal of said storage means being connected in circuit with one of said input terminals;
   b. a switching device having first and second main electrodes and a control electrode, the second terminal of said storage means being connected in circuit with the first main electrode of said switching device;
   c. a control device having first and second main electrodes and a control electrode, at least one main electrode of said control device being connected to the control electrode of said switching device; and
   d. a discharge path, including a unidirectional semiconductor device connecting the second terminal of said inductive energy storage means to one of said output terminals;
   control signal generating means for supplying a plurality of control signals, said control signals having a selectable sequential time relation therebetween;
   means for coupling said control signals to a corresponding one of said control electrodes of said control device in each of said cascaded stages;
   each of said cascaded stages being responsive to said control signals to discharge energy over said discharge paths to said one output terminal, said selectable sequential time relation causing an overlap in time of the energy discharged from adjacent ones of said cascaded stages to said one output terminal, the amount of said overlap being determined by the selectable sequential time relation between the control signals;
   means for generating an error signal related to the signal appearing across said output terminals; and
   means responsive to said error signal and connected in circuit with the second main electrode of said switching devices, said storage means and the second main electrode of said control devices for controlling the magnitude of the energy stored in each of said inductive storage means;
   said circuit being capable of providing a regulated output voltage across said output terminals for the range of potential supplied by said source.

2. The circuit according to claim 1 wherein said inductive storage means comprises at least one winding of a transformer and said switching device comprises a transistor and further wherein said control device comprises a thyristor.

3. The circuit according to claim 2 further comprising a capacitor connected across said pair of output terminals.

4. The circuit comprising:
   first and second input terminals adapted for connection to a source of potential
   a transformer having first and second windings, one end of the first winding being connected in circuit with the first input terminal;
   a switching device having first and second main electrodes and a control electrode, the first main electrode being connected in circuit with the other end of the first winding of said transformer;
   a control means, having two main electrodes and a control electrode, one main electrode of the control means being connected to the control electrode of the switching device, the other main electrode of the control means being connected to one end of the second winding of the transformer, said control means being adapted for selectively controlling the initiation of the conduction of current through said switching device and thereby selectively controlling the initiation of the transfer of energy from said source to the first winding of the transformer;
   first and second output terminals adapted for connection to a load, the second input terminal being connected to the second output terminal;
   a variable impedance device connected in circuit with the second main electrode of said switching device and the other end of the second winding of the transformer;
   feedback means adapted for coupling a signal related to the signal appearing between said output terminals to said variable impedance device, and for controlling the impedance of said impedance device; and
   means connected in circuit between the first main electrode of said switching device and the first output terminal for providing a discharge path for energy stored in the first winding of the transformer.

5. The circuit according to claim 4 wherein said switching device comprises a transistor having a collector, an emitter and a base electrode and wherein said control means includes a thyristor having two main electrodes connected in series with said base electrode and a gate electrode adapted for connection to a source of selectively generated signals.

6. The circuit according to claim 4 further comprising a capacitive energy storage means connected in shunt circuit with said output terminals.

7. The circuit according to claim 6 further including a diode connected in said discharge path in a direction to transfer energy from the first winding of the transformer to the first output terminal.

* * * * *